(12) United States Patent
Cheng (10) Patent No.: US 7,056,372 B2
(45) Date of Patent: Jun. 6, 2006

(54) AIR TREATMENT DEVICE HAVING VARIOUS SELECTIONS

(76) Inventor: Ming Hui Cheng, P.O. Box 63-99, Taichung (TW) 406

( * ) Notice: Subject to any disclaimer, the term of this patent is extended or adjusted under 35 U.S.C. 154(b) by 173 days.

(21) Appl. No.: 10/758,463

(22) Filed: Jan. 13, 2004

(65) Prior Publication Data
US 2005/0150386 A1 Jul. 14, 2005

(51) Int. Cl.
*A61L 9/20* (2006.01)
(52) U.S. Cl. .............................. 96/224; 55/429; 55/506; 96/372; 96/378; 422/24; 422/121
(58) Field of Classification Search .................. 96/224, 96/223, 16, 372, 378, 379; 55/429–433, 55/486, 494, 506; 422/4, 121, 24
See application file for complete search history.

(56) References Cited

U.S. PATENT DOCUMENTS

| | | | | |
|---|---|---|---|---|
| 3,576,593 A * | 4/1971 | Cicirello | ........................ | 422/4 |
| 3,804,942 A * | 4/1974 | Kato et al. | ............... | 423/239.1 |
| 4,210,429 A * | 7/1980 | Golstein | ..................... | 96/142 |
| 5,080,699 A | 1/1992 | Ho et al. | ....................... | 96/129 |
| 5,223,005 A * | 6/1993 | Avondoglio | .................. | 95/280 |
| 5,225,167 A * | 7/1993 | Wetzel | ......................... | 96/224 |
| 5,240,478 A * | 8/1993 | Messina | ...................... | 95/273 |
| 5,433,763 A * | 7/1995 | Shagott et al. | ................ | 55/323 |
| 5,840,092 A | 11/1998 | Rick et al. | ..................... | 55/472 |
| 6,006,534 A | 12/1999 | Correa | ........................ | 62/262 |
| 6,589,486 B1 * | 7/2003 | Spanton | ...................... | 422/121 |
| 6,783,578 B1 * | 8/2004 | Tillman, Jr. | .................. | 96/224 |
| 2001/0043887 A1 * | 11/2001 | Morneault et al. | .......... | 422/121 |
| 2002/0020297 A1 * | 2/2002 | Harris et al. | .................. | 95/273 |

* cited by examiner

Primary Examiner—Richard L. Chiesa
(74) Attorney, Agent, or Firm—Charles E. Baxley (57) ABSTRACT

An air treatment device includes a housing, a filter element disposed in the housing, an air forcing device for forcing air to flow through the filter element, and a light device disposed in front of the filter element for generating light and for germ killing purposes. The housing includes a pressurized compartment formed between the filter element and the air forcing device, to receive the light device. An ozone generator may supply ozone through the filter element for germ killing purposes. An oxygen generator may supply oxygen out of the housing and into the environment of the users. A filter member may be used for filtering purposes, and a tray disposed below the filter member to collected filtered materials.

8 Claims, 9 Drawing Sheets

AIR TREATMENT DEVICE HAVING VARIOUS SELECTIONS

BACKGROUND OF THE INVENTION

1. Field of the Invention

The present invention relates to an air treatment device, and more particularly to an air treatment device having various or different selections or arrangements or choices for selecting various air treating operations.

2. Description of the Prior Art

Typical air treatment devices comprise one or more filter screens or cartridges or the like for filtering purposes, and one or more fan devices or blowers for drawing air through the filter screens or cartridges or the like.

For example, U.S. Pat. No. 5,080,699 to Ho et al., U.S. Pat. No. 5,840,092 to Rick et al., and U.S. Pat. No. 6,006,534 to Correa disclose three of the typical air treatment devices each one or more fan devices or blowers for drawing air through one or more filter screens or cartridges. However, the typical air treatment devices may be used for filtering purposes only, but may not be used for germicidal purposes.

The other typical air treatment devices may comprise one or more light devices for emitting ultraviolet rays to kill germs, or the like. However, normally, the air is quickly drawn through the typical air treatment devices, such that the germs may not be suitably or effectively killed by the ultraviolet light devices.

The present invention has arisen to mitigate and/or obviate the afore-described disadvantages of the conventional air treatment devices.

SUMMARY OF THE INVENTION

The primary objective of the present invention is to provide an air treatment device including various or different selections or arrangements or choices for selecting various air treating operations.

In accordance with one aspect of the invention, there is provided an air treatment device comprising a housing including a chamber formed therein, a filter element disposed in the chamber of the housing, an air forcing device for forcing air to flow through the filter element, and a light device disposed in front of the filter element for generating light and for germ killing purposes. The housing includes a pressurized compartment formed between the filter element and the air forcing device, to receive the light device.

The light device is preferably an ultraviolet ray light device for generating ultraviolet rays. The filter element is preferably made of ultra low particle air (ULPA) filter materials. The housing includes a passageway formed behind the filter element, and an upper compartment formed therein and communicating with the passageway for receiving filter air through the filter element.

The housing includes a plate disposed in the chamber of the housing to form a passage in the housing, the plate includes an orifice formed therein for allowing air to flow from the passage of the housing through the orifice of the plate, the air forcing device includes a fan device disposed close to the orifice of the plate, to force the air to flow through the orifice of the plate.

The housing includes a partition disposed therein to separate the housing into an upper chamber and a lower space, the partition includes a pathway formed therein to communicate the space and the chamber thereof with each other.

The housing includes a filter member attached to the partition, to shield the pathway of the partition, for filtering purposes. The housing includes a channel defined by a pair of opposite flanges to slidably receive the filter member.

The housing includes a tray disposed in the space thereof, and located below the filter member to collect filtered materials. The housing includes a channel defined by a pair of opposite flanges, the tray includes two flanges slidably engaged with the flanges of the housing, to attach the tray to the housing.

An ozone generator may further be provided to generate and supply ozone through the filter element. An oxygen generator may further be provided to generate and supply oxygen out of the housing. The housing includes an exit formed therein, and a hose coupled between the exit of the housing and the oxygen generator to supply the oxygen out of the housing via the exit of the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1–7, an air treatment device in accordance with the present invention comprises a housing 10 including a partition 11 formed or provided in the middle portion thereof, to separate an interior of the housing 10 into a lower space 12 and an upper chamber 13 therein, and including a pathway 14 formed in the front portion of the partition 11 (FIGS. 2 and 7–10) for communicating the space 12 and the chamber 13 with each other.

The housing 10 further includes a ceiling 15 formed or provided in the upper portion thereof (FIGS. 7–10), and located above the chamber 13 of the housing 10, to form or define a compartment 16 in the upper portion of the housing 10. The housing 10 includes an air inlet 17 formed in the front portion thereof and communicating with the lower space 12 thereof (FIGS. 1, 2, 4), for permitting air to flow into the space 12 of the housing 10. A door 18 may be provided to enclose the space 12 of the housing 10.

A channel 20 is formed or provided in the lower portion of the partition 11 of the housing 10, and defined by a pair of opposite flanges 21 (FIGS. 5, 6), to slidably receive a wavy-shaped and/or active carbon filter member 22 which may shield or cover the pathway 14 of the housing 10 (FIGS. 7–10), to filter the air flowing through the pathway 14 of the housing 10. Dirt or dust may be effectively filtered when the air is flowing upwardly from the lower space 12 through the pathway 14 and then into the upper chamber 13 of the housing 10.

Another channel 23 may further be formed or provided in the lower portion or the bottom of the housing 10, and defined by a pair of opposite flanges 24 (FIGS. 5, 6), to slidably receive or support a tray 25 which includes two corresponding flanges 26 to slidably engage with the flanges 24 of the channel 23 of the housing 10. The tray 25 is located below the filter member 22, and preferably located below the pathway 14 of the housing 10, to collect the dirt or the dust that may be filtered by and dropped from the filter member 22.

An opening 30 is formed in the front portion of the housing 10 (FIGS. 1, 2), and enclosed by a cover 31 (FIGS. 1, and 7–10), a plate 32 is disposed in the chamber 13 of the housing 10, and arranged in parallel to the cover 31, to form or define a passage 33 in the front portion of the upper chamber 13 and between the plate 32 and the cover 31, and communicating with the pathway 14 of the housing 10, for allowing the air to flow upwardly from the lower space 12 through the pathway 14 and then into the passage 33 of the housing 10.

The plate 32 includes an orifice 34 formed therein for allowing the air to flow rearwardly from the pathway 14 and the passage 33 into the rear portion 19 of the chamber 13 of the housing 10, and includes a net 35 attached thereto, to cover or shield the orifice 34 of the plate 32, and to prevent particles from flowing through the orifice 34 of the plate 32. A motor 37 is secured or disposed in the rear portion 19 of the chamber 13 of the housing 10 with a support 38, and a blower or a fan device 39 is attached to and driven by the motor 37 and located close to the orifice 34 of the plate 32, to draw air through the orifice 34 of the plate 32 and into the rear portion 19 of the chamber 13 of the housing 10.

A filter element 40 is further provided and secured or disposed in the rear portion 19 of the chamber 13 of the housing 10, and spaced away from the motor 37 and the fan device 39, to form or define a pressurized compartment 41 in front of the filter element 40 or between the filter element 40 and the motor 37 and the fan device 39. The fan device 39 may be actuated by the motor 37 to draw the air through the orifice 34 of the plate 32, or to supply pressurized air into the pressurized compartment 41 that is defined between the filter element 40 and the motor 37 and the fan device 39.

Figure 1:
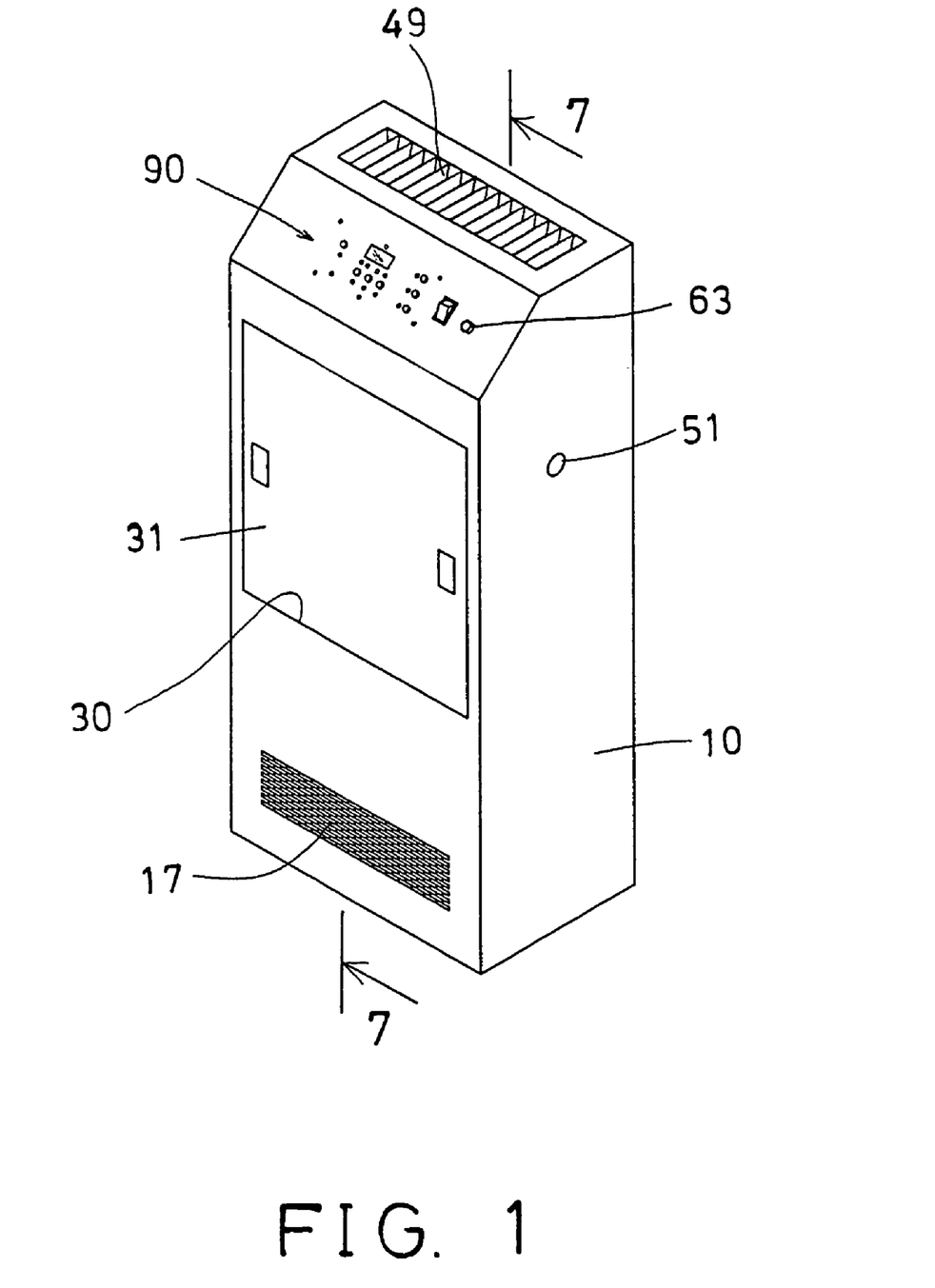
FIG. 1 is a front perspective view of an air treatment device in accordance with the present invention.
Figure 2:
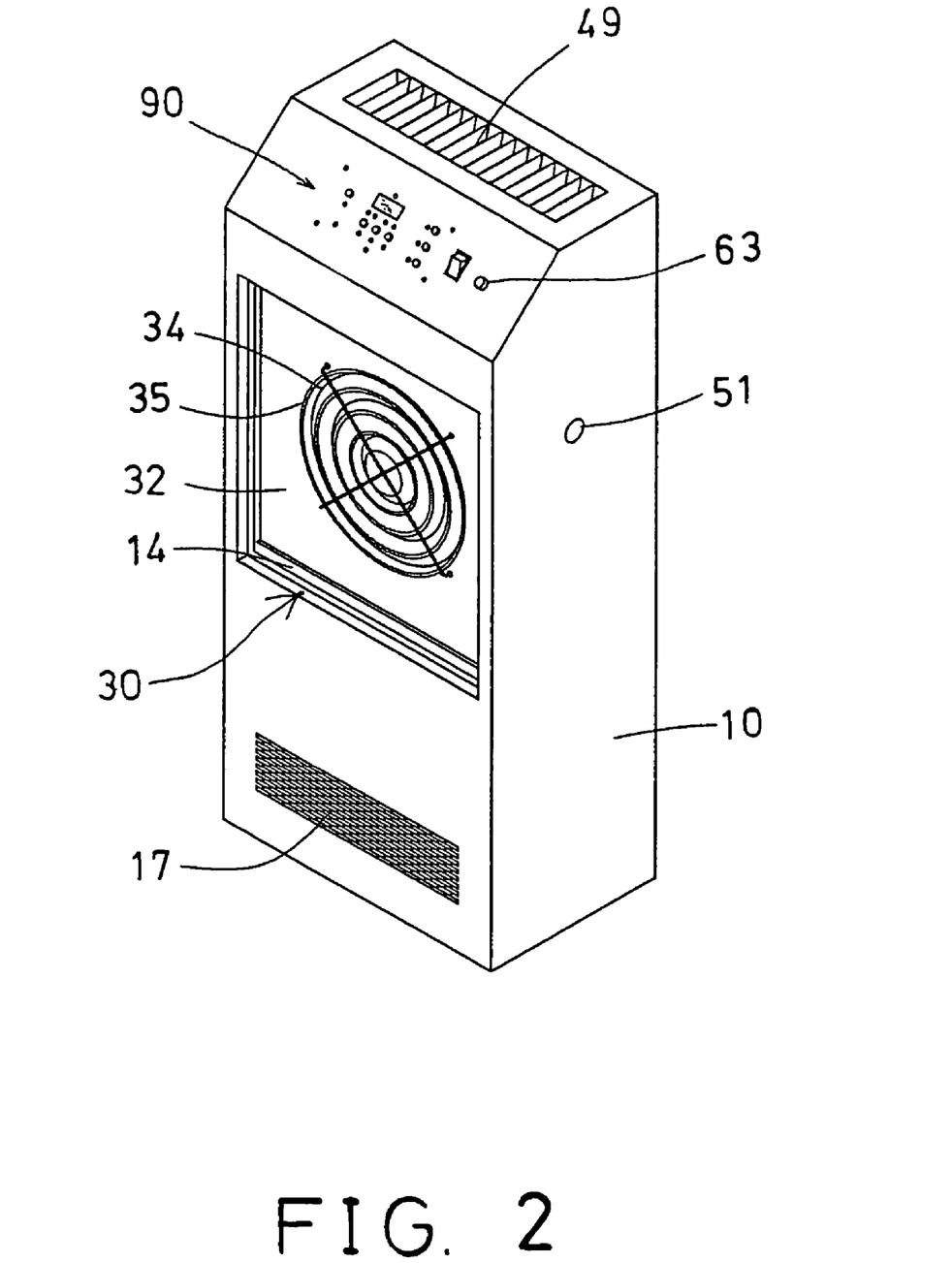
FIG. 2 is a front perspective view similar to FIG. 1, in which a front cover has been removed for showing an inner structure of the air treatment device.
Figure 3:
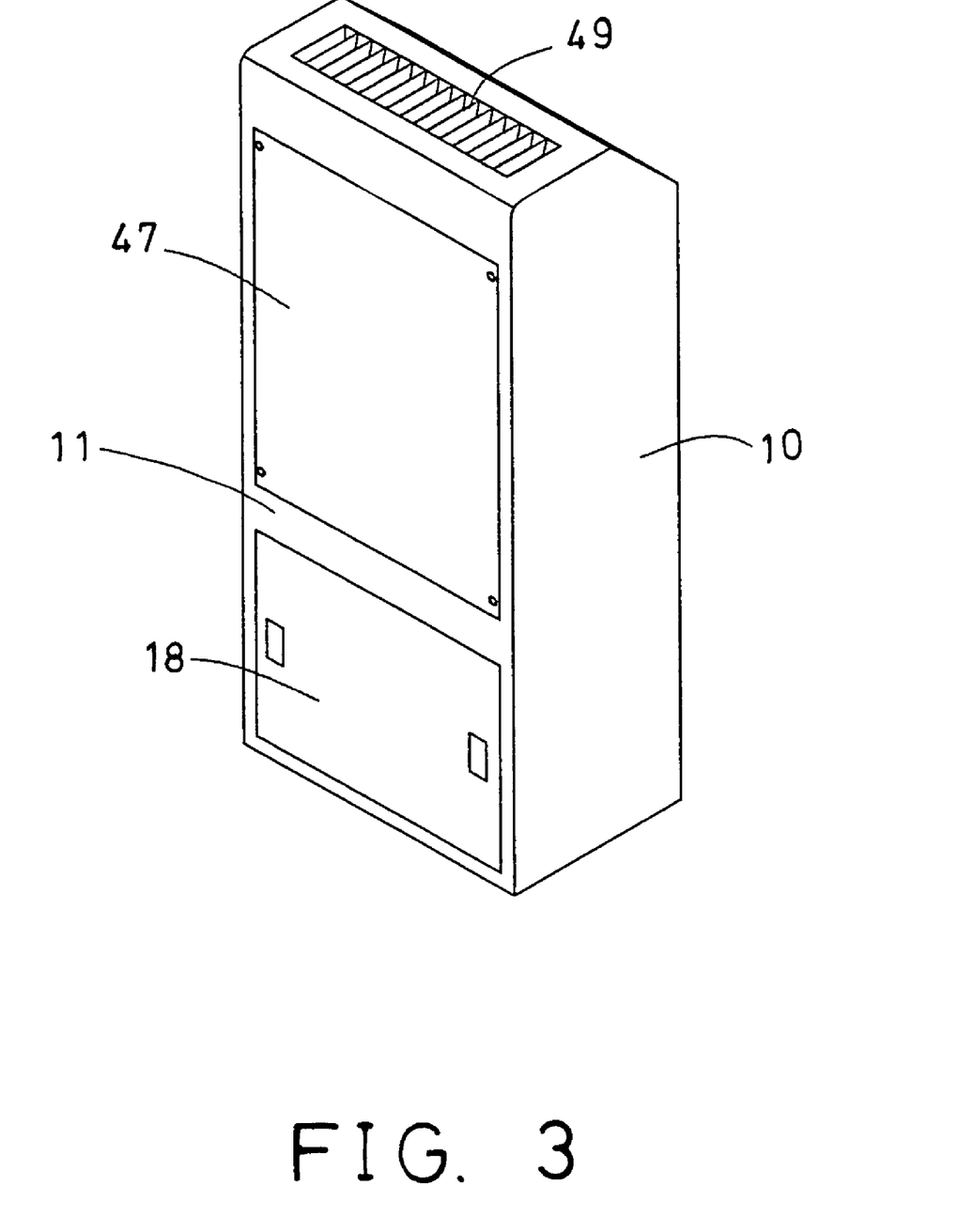
FIG. 3 is a rear perspective view of the air treatment device.
Figure 4:
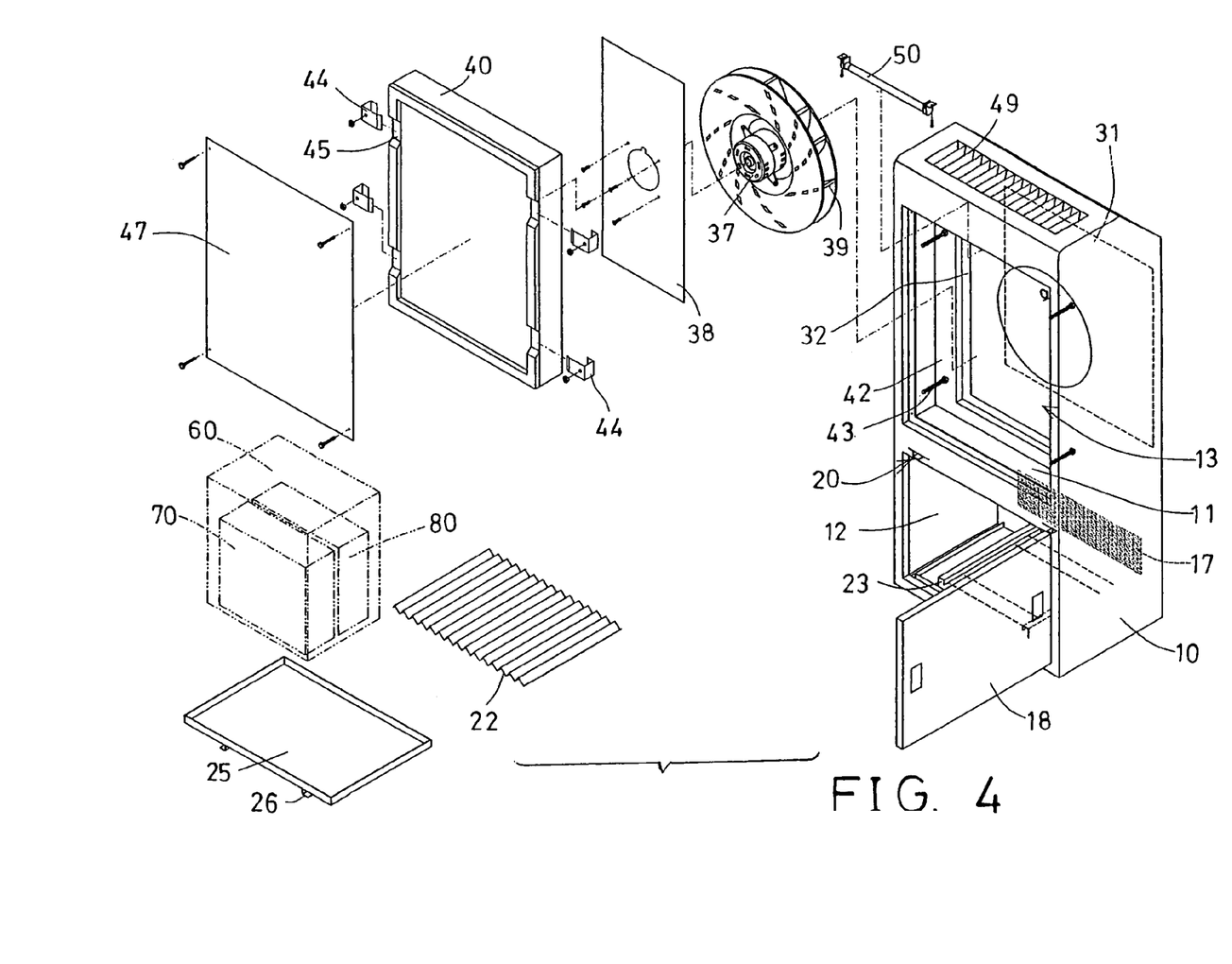
FIG. 4 is a partial exploded view of the air treatment device.
Figure 5:
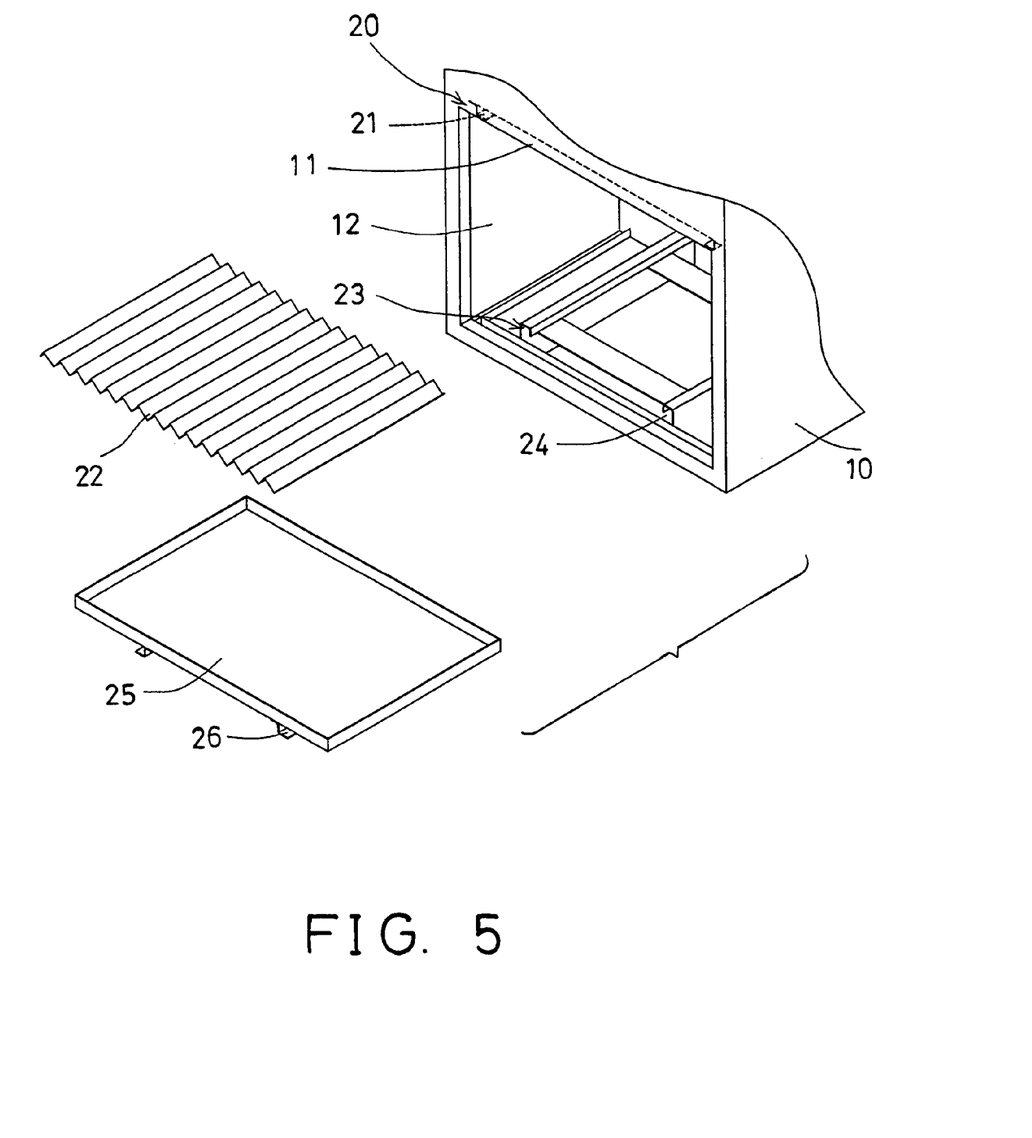
FIG. 5 is an enlarged partial exploded view of the air treatment device.
Figure 6:
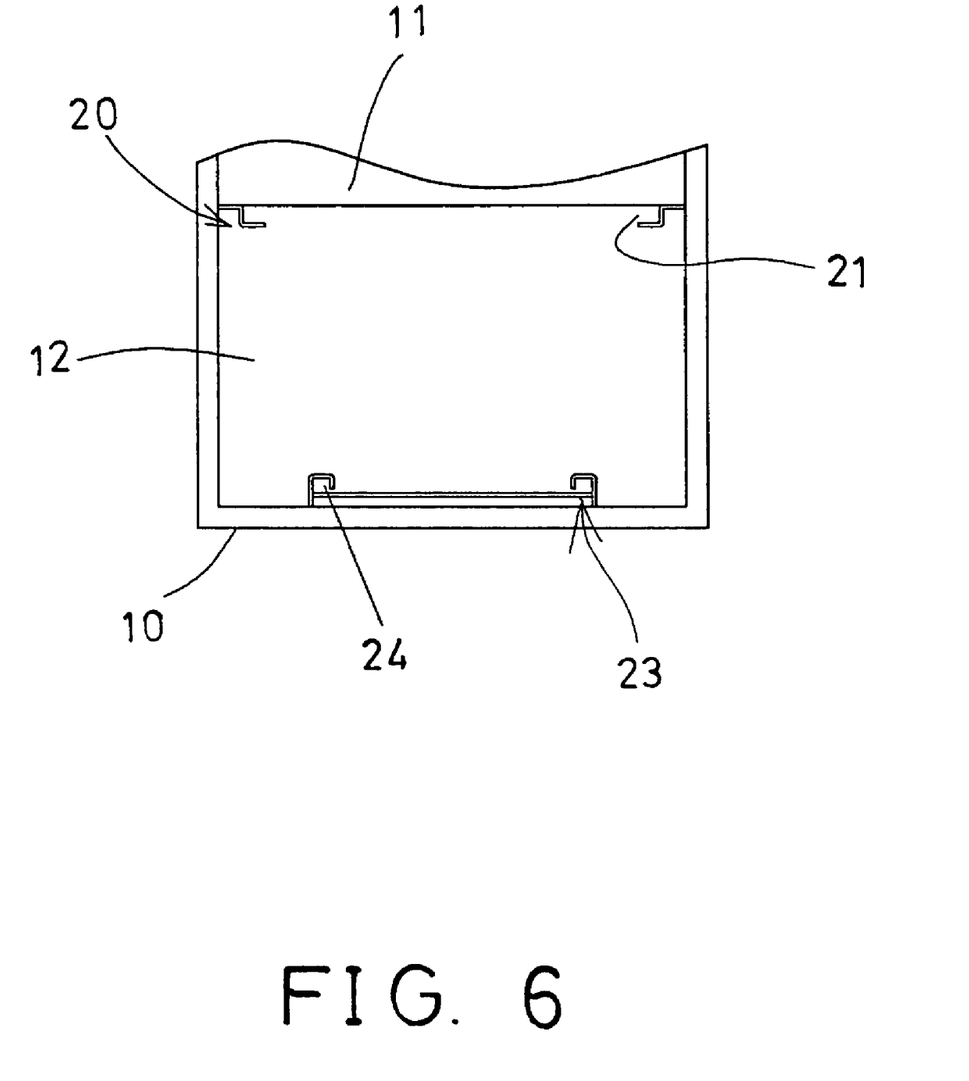
FIG. 6 is a partial front view of the air treatment device as shown in FIG. 5.
Figure 7:
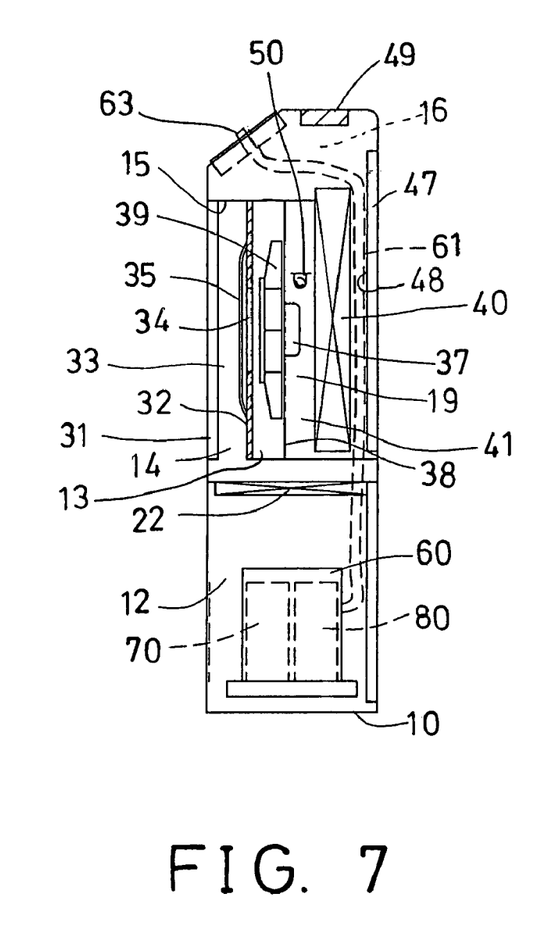
FIG. 7 is a partial cross sectional view taken along lines 7—7 of FIG. 1.
Figure 8:
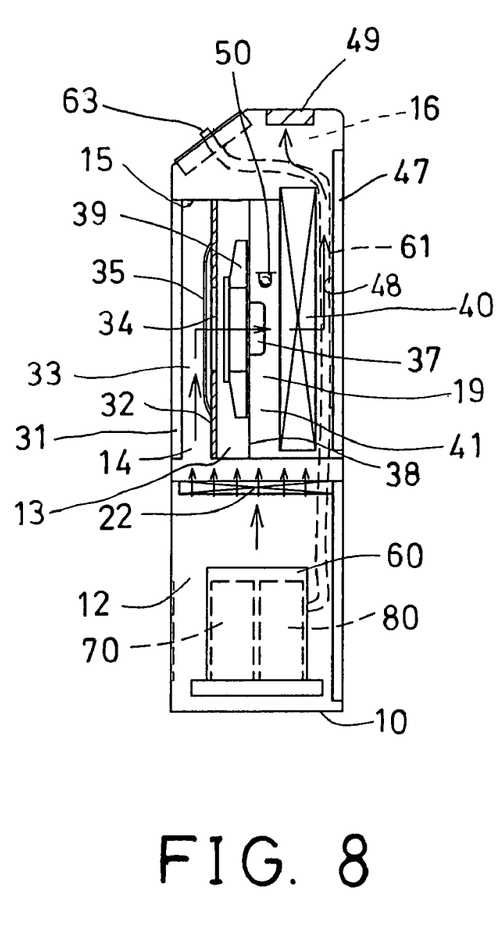
FIGS. 8, 9, 10 are partial cross sectional views similar to FIG. 7, illustrating the operation of the air treatment device.

As shown in FIG. 4, the housing 10 may include a peripheral frame 42 extended into the rear portion 19 of the chamber 13 of the housing 10 for engaging with and for positioning the filter element 40 in the housing 10, and one or more fasteners 43 attached to the frame 42 and each engaged with a bracket 44 which may be engaged with the filter element 40, to secure the filter element 40 to the frame 42. The filter element 40 may include one or more recesses 45 formed therein to receive and position the bracket 44, A cap 47 is secured to the rear portion of the housing 10, to enclose the chamber 13 of the housing 10. The filter element 40 is spaced away from the cap 47 to form or define a passageway 48 behind the filter element 40 or between the filter element 40 and the cap 47. The passageway 48 is communicated with the upper compartment 16 of the housing 10, for allowing the air filtered through the filter element 40 to flow out through an upper air outlet 49 of the housing 10 via the passageway 48 that is formed or defined between the filter element 40 and the cap 47 (FIG. 8).

The filter element 40 is made of such as ultra low particle air (ULPA) filter materials which is a type of air filter that removes 99.999% of particles 0.12 μm or larger. In addition, the ULPA filter element 40 allows only pressurized air to flow therethrough, such that the pressurized air in the pressurized compartment 41 defined between the filter element 40 and the motor 37 and the fan device 39 may be maintained in a predetermined pressure and may be formed into an eddy current or may flow in low speed.

A light device 50 may further be provided and secured in the housing 10, and preferably disposed in the pressurized compartment 41 that is defined in front of the filter element 41 or between the filter element 40 and the motor 37 and the fan device 39, where the pressurized air may flow in eddy currents or may flow in low speed. The light device 50 may emit such as ultraviolet rays to kill germs, or the like. Due to the slow flowing of the pressurized air, the light device 50 may be used to effectively kill the germs or the like. A window 51 (FIGS. 1, 2) may be provided in one or both sides of the housing 10 for viewing whether the light device 50 is working or not.

As shown in FIGS. 4 and 7–10, a casing 60 may further be provided and disposed in the lower space 12 of the housing 10, an ozone generator 70 and an oxygen generator 80 may further be provided and disposed in the casing 60, for generating ozone and oxygen respectively, and for supplying the generated ozone and oxygen out through a hose 61 and an exit 63 (FIGS. 1, 2, and 7–10).

Figures 9, 10:
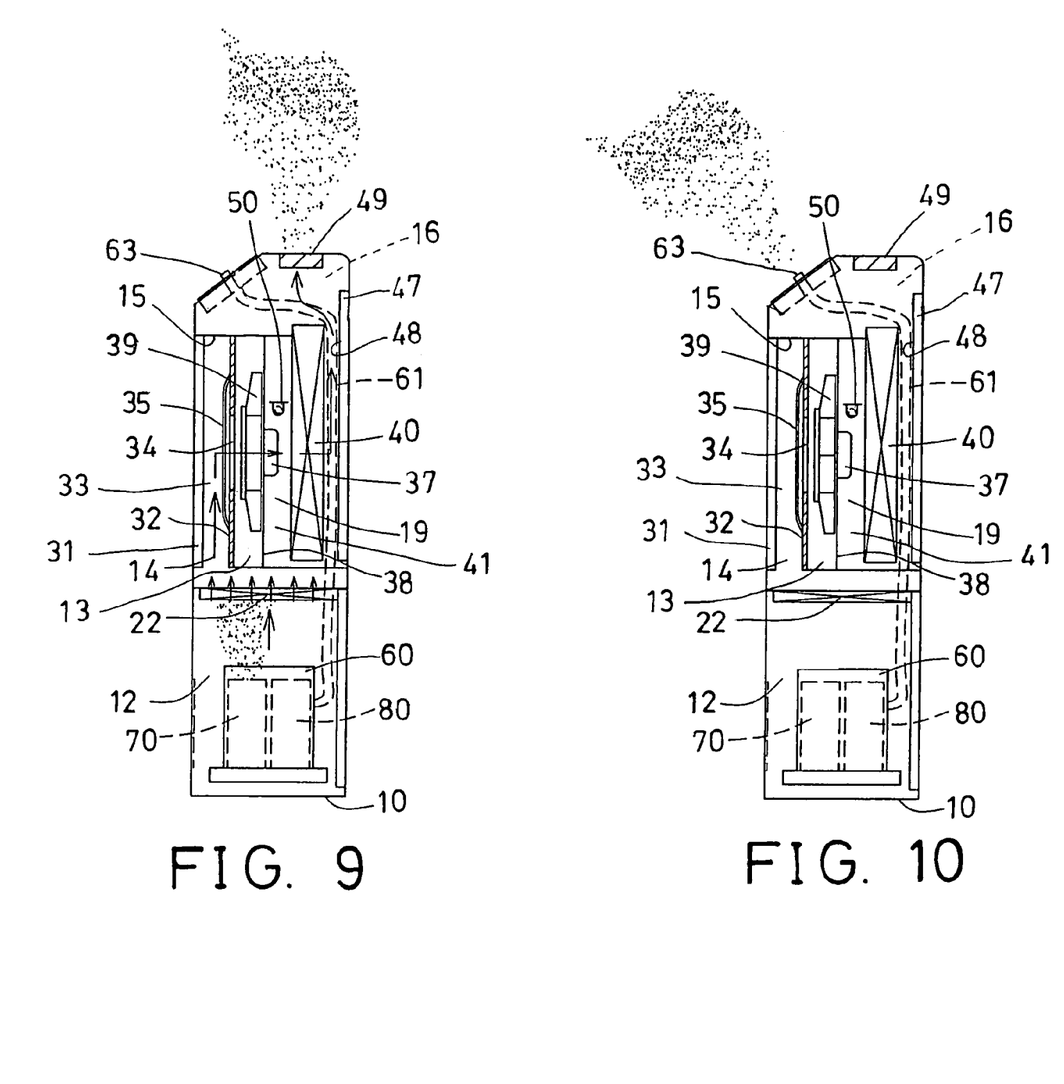
Figure 11:
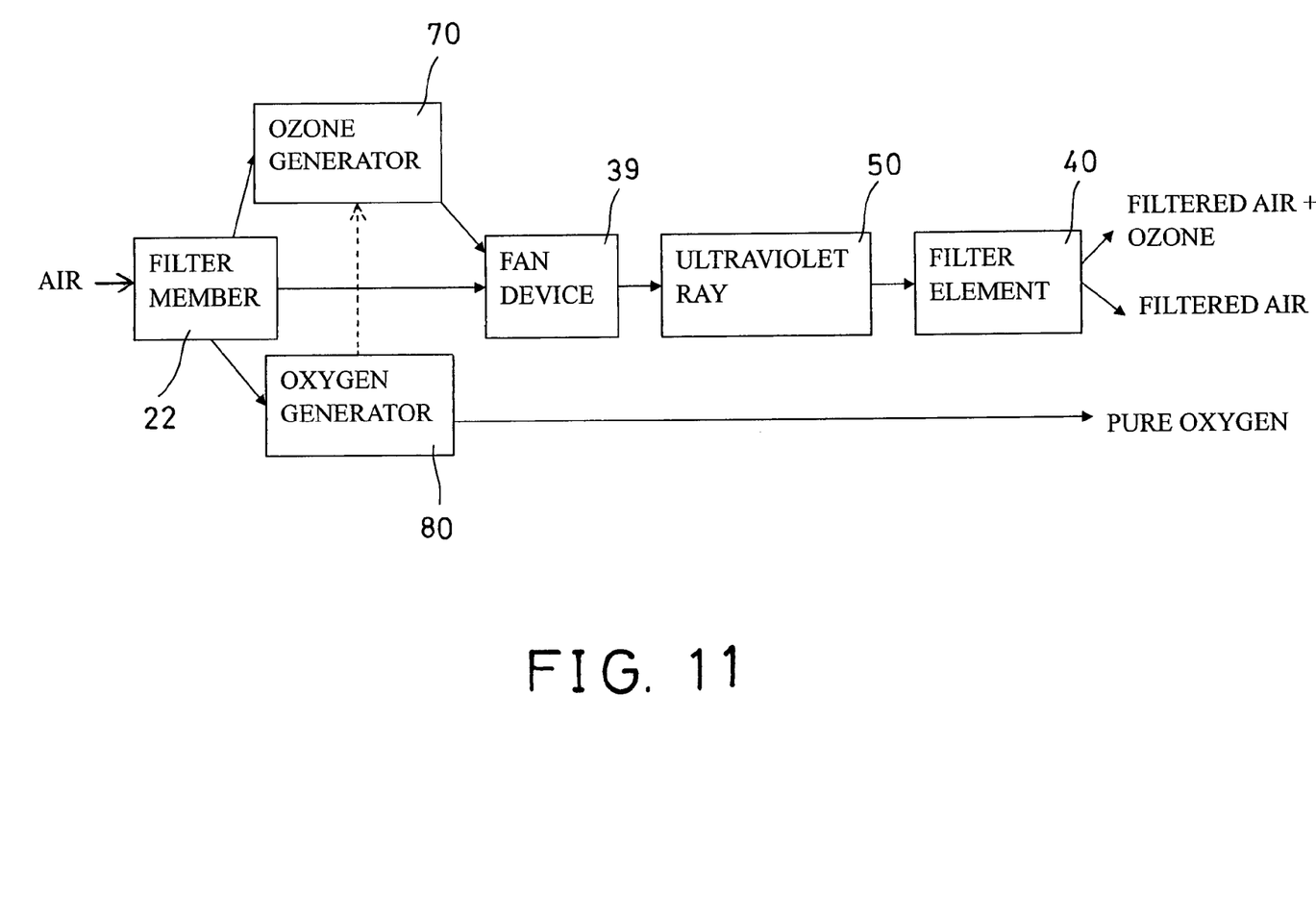
FIG. 11 is a block diagram illustrating the arrangements or selections or choices of the air treatment device.

It is preferable that the oxygen generator 80 may generate and supply the oxygen directly out through the hose 61 and the exit 63 (FIGS. 10, 11), without flowing through the filter member 22 and the filter element 40, in order to directly supply the oxygen to our environment. As shown in FIGS. 9 and 11, the ozone generated by the ozone generator 70 may preferably flow into the space 12 of the housing 10, and through the passage 33 defined between the plate 32 and the cover 31, and then drawn by the fan device 39, and then lighted by the ultraviolet light device 50, and then through the filter element 40.

As shown in FIGS. 8 and 11, when the ozone generator 70 is not operated or energized to generate the ozone, the air may be directly drawn into the pressurized compartment 41 that is defined between the filter element 40 and the motor 37 and the fan device 39, by the fan device 39, and then may be lighted by the ultraviolet light device 50, and then may be forced to flow through the filter element 40, and then flow out through the upper air outlet 49 of the housing 10 via the passageway 48 that is formed or defined between the filter element 40 and the cap 47.

Accordingly, as shown in FIG. 11, the air treatment device in accordance with the present invention may be selected to supply only the oxygen out through the exit 63 (FIG. 10), and/or to supply the filtered air through the ultraviolet light device 50 and the filter element 40 (FIG. 9), and/or to supply the filtered air through the ozone generator 70 and the ultraviolet light device 50 and the filter element 40 (FIG. 8). A control panel 90 (FIGS. 1, 2) may be provided on top of the housing 10 to control the air treatment device, and to select or operate either of the operation modes as shown in FIGS. 8–11.

Accordingly, the air treatment device in accordance with the present invention includes various or different selections or arrangements or choices for selecting various air treating operations.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air treatment device comprising:
   a housing including a chamber formed therein, and including a pressurized compartment formed therein, and including a partition disposed therein to separate said housing into an upper chamber and a lower space, said partition including a pathway formed therein to communicate said space and said chamber thereof with each other,
   a filter member attached to said partition of said housing to shield said pathway of said partition,
   a plate disposed in said chamber of said housing to form a passage in said housing, said plate including an orifice formed therein for allowing air to flow from said passage of said housing through said orifice of said plate,
   a filter element disposed in said chamber of said housing,
   means for forcing air to flow through said filter element, and said air forcing means including a fan device disposed close to said orifice of said plate to force the air to flow through said orifice of said plate,
   an ultraviolet ray light device disposed in front of said filter element and disposed in said pressurized compartment of said housing for generating ultraviolet rays and for germ killing purposes, said pressurized compartment of said housing being formed between said filter element and said air forcing means to receive said ultraviolet ray light device, and
   an ozone generator to generate and supply ozone through said filter element to kill germs at the same time.

2. The air treatment device as claimed in claim 1, wherein said filter element is made of ultra low particle air (ULPA) filter materials.

3. The air treatment device as claimed in claim 1, wherein said housing includes a passageway formed behind said filter element, and an upper compartment formed therein and communicating with said passageway for receiving filter air through said filter element.

4. The air treatment device as claimed in claim 1, wherein said housing includes a channel defined by a pair of opposite flanges to slidably receive said filter member.

5. The air treatment device as claimed in claim 1, wherein said housing includes a tray disposed in said space thereof, and located below said filter member to collect filtered materials.

6. The air treatment device as claimed in claim 5, wherein said housing includes a channel defined by a pair of opposite flanges, said tray includes two flanges slidably engaged with said flanges of said housing, to attach said tray to said housing.

7. The air treatment device as claimed in claim 1 further comprising an oxygen generator to generate and supply oxygen out of said housing.

8. The air treatment device as claimed in claim 7, wherein said housing includes an exit formed therein, and a hose coupled between said exit of said housing and said oxygen generator to supply the oxygen out of said housing via said exit of said housing.

* * * * *